(12) United States Patent
Kolavi

(10) Patent No.: US 7,440,398 B2
(45) Date of Patent: Oct. 21, 2008

(54) FAULT TOLERANT COMMUNICATION APPARATUS

(75) Inventor: Shashi Kumar M Kolavi, Ka (IN)

(73) Assignee: Honeywell International Inc., Morristown, NJ (US)

( * ) Notice: Subject to any disclaimer, the term of this patent is extended or adjusted under 35 U.S.C. 154(b) by 717 days.

(21) Appl. No.: 10/999,036

(22) Filed: Nov. 29, 2004

(65) Prior Publication Data
US 2006/0184636 A1 Aug. 17, 2006

(51) Int. Cl.
H04L 1/00 (2006.01)
(52) U.S. Cl. ...................................... 370/225
(58) Field of Classification Search ............ None
See application file for complete search history.

(56) References Cited

U.S. PATENT DOCUMENTS

| | | | |
|---|---|---|---|
| 6,016,553 A | 1/2000 | Schneider et al. | |
| 6,191,713 B1 | 2/2001 | Ellis et al. | |
| 6,199,178 B1 | 3/2001 | Schneider et al. | |
| 6,546,450 B1 * | 4/2003 | Liu | 710/316 |
| 6,600,739 B1 * | 7/2003 | Evans et al. | 370/362 |
| 6,658,518 B2 | 12/2003 | Domon | |
| 2001/0042221 A1 | 11/2001 | Moulton et al. | |
| 2002/0049883 A1 | 4/2002 | Schneider et al. | |
| 2003/0041205 A1 | 2/2003 | Wu et al. | |
| 2003/0177297 A1 | 9/2003 | Hesse et al. | |

FOREIGN PATENT DOCUMENTS

| | | |
|---|---|---|
| EP | 0028440 A2 | 5/1981 |
| GB | 2262680 A | 6/1993 |
| GB | 2266035 A | 10/1993 |
| GB | 2352540 * | 1/2001 |
| WO | WO8801543 A1 | 3/1988 |
| WO | WO8904100 A1 | 5/1989 |
| WO | WO8910801 A1 | 11/1989 |
| WO | WO9015391 A1 | 12/1990 |
| WO | WO9606490 A1 | 2/1996 |
| WO | WO9858356 A2 | 12/1998 |
| WO | WO9912101 A2 | 3/1999 |
| WO | WO0161494 A1 | 8/2001 |

* cited by examiner

*Primary Examiner*—Frank Duong
(74) *Attorney, Agent, or Firm*—Schiff Hardin LLP (57) ABSTRACT

A fault tolerant communication apparatus provides redundant links between at least two computers. The apparatus includes a first set of links connected to a first computer, a second set of links connected to at least one second computer, and a communication controller between the first set of links and the second set of links. The communication controller ensures communication between the two computers if there is at least one active link between the computers for data communication. USB/Firewire based serial links can be used.

22 Claims, 5 Drawing Sheets

FAULT TOLERANT COMMUNICATION APPARATUS

TECHNICAL FIELD OF THE INVENTION

The present invention relates to an apparatus for data communication between two computers and is suitable for use in a data redundancy system.

BACKGROUND OF THE INVENTION

A data redundancy system includes a plurality of computers each of which stores a copy of the same data. Such data redundancy systems are used to provide data backup of critical data. Prominent applications of data redundancy include database management systems, history maintenance, and automation controller circuits. In such applications, the data redundancy system includes a plurality of computers that store multiple copies of the same data. In particular, there is a primary computer and one or more secondary computers. The data stored in the primary computer is used by an external user/application. In the event of a fault in the primary computer system or in the access mechanism thereof, the data stored in the secondary computer can instead be used.

Conventionally, there are various communication options available for data communication within a data redundancy system. Important factors that need to be considered while selecting a particular communication option include cable length, power requirements, reliability, and cost. In particular, for a data redundancy application, the selected communication option should provide high speed, real time, reliable, and low cost communication.

Communication between computers is typically enabled by using either serial links or parallel links. Serial link communication is usually based on Ethernet based network protocols such as Transmission Communication Protocol (TCP) and Internet Protocol (IP). The link includes one or more cables and is enabled to communicate data conforming to a desired protocol. The cable is desirably adapted to ensure reliable as well as cost effective communication. Typical cable assemblies that achieve such a desired result include, without limitation, RS 232/432/485, a copper based cable assembly, or an optical cable assembly.

Parallel link communication is typically based on standards such as IEEE 1284, IEEE 488, and the like. These protocols and communication mechanisms define both uni-directional and bi-directional communication with a variety of communication speeds.

Generally, data redundancy systems serve two purposes. The first purpose is to maintain multiple copies of the data, which ensures that, even if the data stored in one of the computers is lost, the data can still be retrieved from one or more other computers. The second purpose is to ensure that the user is still able to retrieve data from the database of redundant computer even where communication with the external user accessing the data from one of the computers fails.

These objectives require one-to-one mapping (i.e., synchronization) between the data stored in each of the databases of the computers in the data redundancy system. The exchange of data between the computers is desirably fast and accurate. Fast and accurate data exchange requires an assessment of data consistency and integrity in a short time. Ideally, this assessment needs to be done in real time. Synchronization ensures that, even if communication between the external user and one of the computers fails, a copy of the required data can still be retrieved from a redundant computer.

Conventional redundancy systems suffer from a number of limitations. For example, the transmission of high speed data over conventional systems such as an RS 232/432/485 cable system is not reliable. The probability of error during the exchange of information is very high in the case of an RS 232/432/485 cable system. The alternative to an RS 232/432/485 cable system is an optical cable apparatus assembly. However, the application of an optical cable apparatus assembly is constrained by its complex hardware and associated cost.

Also, the connection is not robust. In particular, a single point failure in the connection results in a communication failure between the computers. Further, there is no mechanism to identify the point of the failure, i.e., the point at which the failure is encountered. Even if the fault is identified, switching of the communication channel so as to the correct the channel takes a substantial amount of time, which leads to an unnecessary delay in the transfer of data.

Moreover, the connection between the computers requires additional circuitry, such as an Ethernet network card, that adds to the complexity of the apparatus. In the case where an optical cable assembly is used to make the connection, additional hardware and back plane assemblies may be required, which adds to the cost of implementation. On the other hand, a connection based on an RS 232/432/485 cable assembly is simpler and less expensive, but it is not reliable. Consequently, the cost of system implementation is high. Further, the power consumption of the communication channel is high.

Accordingly, there is a need for a redundancy control apparatus that enables a reliable, high speed connection between computers. Additionally or alternatively, there is a need for a redundancy control apparatus that identifies the point of failure, if any, and/or avoids additional electrical circuits in establishing the connection in order to reduce cost.

SUMMARY OF THE INVENTION

According to one aspect of the present invention, an apparatus for enabling fault tolerant data communication between at least two computers comprises a set of first links connected to a first computer, a set of second links connected to at least one second computer, and a communication controller. The communication controller is coupled to each of the first and second links. The communication controller is arranged to identify an active one of the first links and an active one of the second links and to establish data communication between the identified active one of the first links and the identified active one of the second links, and the communication controller is further arranged to detect a fault in the identified active one of the first links and to switch data communication with the identified active one of the second links over to another active one of the first links.

According to another aspect of the present invention, an apparatus is provided for communicating between a set of first active links and a set of second active links. The set of first active links is connected to a first computer, and the set of second active links is connected to at least one second computer. Each of the links is a Universal Serial Bus (USB) link. The apparatus enables fault tolerant data communication between the first and the second computer and comprises a link identifier, a link associater, and a switch. The link identifier is arranged to identify an active link, and the link identifier applies arbitration criteria to arbitrate between the first USB links. The link associater is arranged to associate an active first USB link to an active second USB link, and the link associater applies arbitration criteria to arbitrate between the second USB links. The switch is arranged to switch data received on an active first USB link to its associated active second USB link. The switch comprises a receiver, a buffer, a transmitter, a plurality of data paths, and a switching logic. The receiver is arranged to receive data from the first computer over the active first USB link. The buffer is arranged to store the received data. The transmitter is arranged to transmit the stored data to the second computer over the active second USB link. The plurality of data paths is arranged to interconnect the active first USB link to its associated active second USB link. The switching logic is arranged to select one of the data paths to interconnect the buffer and the transmitter.

According to still another aspect of the present invention, a redundancy control apparatus for communication between a pair of computers comprises a set of first links connected to a first computer, a set of second links connected to at least one second computer, and a communication controller arranged to communicate data between at least one of the active first links and at least one of the active second links. At least one of the first links comprises an active first link, and each of the first links comprises a serial link. At least one of the second links comprises an active second link, and each of the second links comprises a serial link. The communication controller comprises a link identifier, a link associater, and a switch. The link identifier is arranged to identify one of the active first links. The link associater is arranged to associate the identified active first link to an identified active second link. The switch is arranged to switch data between the identified first link and the identified second link associated therewith.

According to yet another aspect of the present invention, a method provides redundancy between at least first and second computers. A host interacts with the first computer to access data stored therein, and the host interacts with the second computer to access the data in the event that communication between the host and the first computer fails. The first computer is connected to a set of first active links, and the second computer is connected to a set of second active links. The method comprises the following: identifying at least one of the active first links; identifying at least one of the active second links; and, switching data received on the identified first link to the identified second link.

According to a further aspect of the present invention, a computer program product is provided for use with a computer. The computer program product comprises a computer usable storage medium that stores computer readable program code thereon for providing fault tolerant data communication between a host and at least first and second computers of a redundant computer system to permit the host to interact with the first computer to access data stored therein and to interact with the second computer to access the data in the event that communication between the host and the first computer fails. The first computer is connected to a set of first active links, and the second computer is connected to a set of second active links. The computer program code comprises first program instructions which, when executed, identify at least one of the active first links, second program instructions which, when executed, identify at least one of the active second links, and third program instructions which, when executed, switch data received on the identified first link to the identified second link.

BRIEF DESCRIPTION OF THE DRAWINGS

These and other features and advantages will become more apparent from a detailed consideration of the invention when taken in conjunction with the drawings in which.

DETAILED DESCRIPTION

A data redundancy system includes a plurality of computers each of which store a copy of the same data. Such data redundancy systems provide backup of critical data. Prominent applications that use data redundancy include database management systems, history maintenance systems, and automation controller circuits. Communication within such a data redundancy system is critical to ensure synchronization of the data stored in each of the redundant computers of the data redundancy system.

According to an embodiment of the present invention, a reliable fault tolerant communication apparatus connects a plurality of computers. In particular, the redundancy control apparatus enables fault tolerant, real time, and/or synchronous data communication within a redundancy apparatus.

Figure 1:
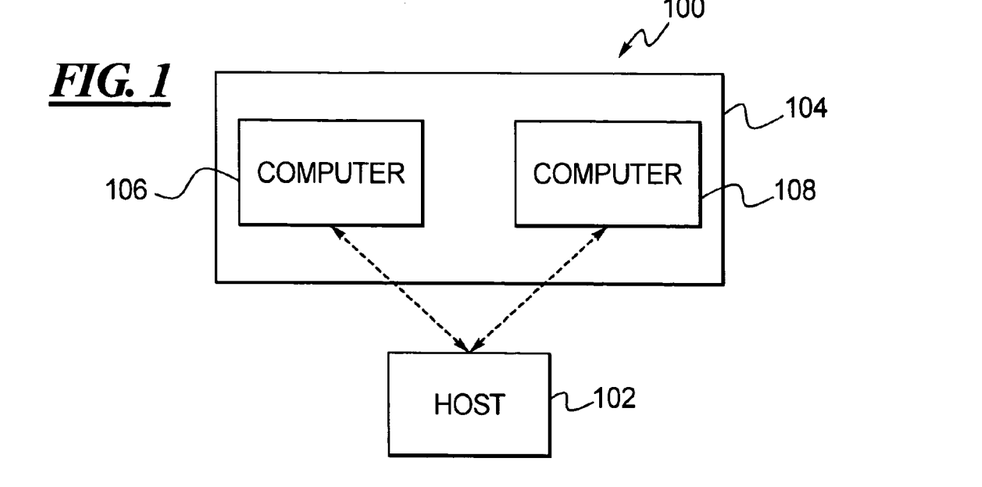
FIG. 1 shows host and redundant computers providing an exemplary environment for the present invention.

FIG. 1 depicts an example of a data redundancy system 100 that includes a host 102 and a redundancy apparatus 104. The host 102 fetches data stored in the redundancy apparatus 104 for use by specific applications. The redundancy apparatus 104 stores multiple copies of the data to be fetched. The redundancy apparatus 104 includes a plurality of computers each storing a copy of the data.

In accordance with an embodiment of the present invention, the redundancy apparatus 104 includes at least first and second computers 106 and 108. Multiple copies of the data on the plurality of computers ensure retrieval of data from another computer in case one of the redundant computers breaks down. For example, if the first computer 106, from which the host 102 is fetching data, breaks down, the same data may be fetched from the second computer 108.

Figure 2:
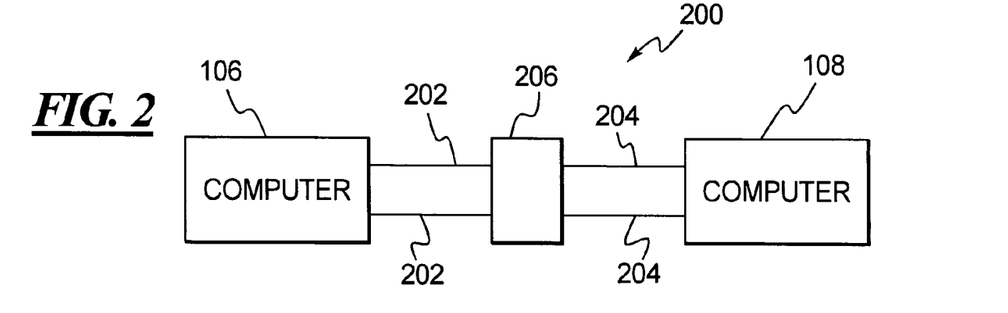
FIG. 2 depicts a communication controller between the redundant computers of FIG. 1.

FIG. 2 depicts the redundancy apparatus 104 in greater detail. The redundancy apparatus 104 includes the first computer 106, the second computer 108, and a redundancy control apparatus 200. The redundancy control apparatus 200 enables and controls communication between the plurality of computers of the redundancy apparatus 104. The redundancy control apparatus 200 includes a set of first links 202 connected to the first computer 106, a set of second links 204 connected to the second computer 108, and a communication controller 206. The communication controller 206 enables communication between at least an active one of the first links 202 and at least an active one of the second links 204.

Each of the first and second links 202 and 204, for example, may be a serial link that is capable of transmitting data serially. Alternatively, each of the first and second links 202 and 204, for example, may be a parallel link that is capable of transmitting data in parallel. As a further alternative, some of the first and second links 202 and 204 may be parallel links that are capable of transmitting data in parallel, and some of the first and second links 202 and 204 may be serial links that are capable of transmitting data serially.

Communication between the first and second computers 106 and 108 is established by activating at least one of the first links 202 and at least one of the second links 204, i.e., a data communication path may be generally established between the first and second computers 106 and 108 through the active one of the first links 202 and the active one of the second links 204.

Universal Serial Bus (hereinafter "USB") links, for example, may be used to provide serial links. Such USB based links may be compliant with the USB 2.0 specification. However, it will be apparent to one skilled in the art that any USB standard can be used without departing from the scope and spirit of the present invention. Each of these USB links can be connected to the first and second computers 106 and 108 through a corresponding USB port coupled to each computer. USB links are capable of duplex communication. In an alternate embodiment, Firewire links based on IEEE1394 standard can be used to provide serial links.

Parallel links, for example, may be based on standards such as IEEE 1284 and IEEE 488 and the like. However, it will be apparent to one skilled in the art that any parallel link standard can be used without departing from the scope and spirit of the technique.

The communication controller 206 enables communication between at least an active one of the first links 202 and an active one of the second links 204. The communication controller 206 provides redundant paths between the first and second computers 106 and 108, thereby improving the reliability of communication between the first and second computers 106 and 108. This improved reliability ensures communication between the first and second computers 106 and 108 if at least one of the first links 202 and one of the second links 204 is available. In case the connection between the active one of the first links 202 and the active one of the second links 204 fails, an alternate available connection is activated to enable communication between the first and second computers 106 and 108.

Accordingly, fault tolerance is improved by providing multiple redundant links to support communication between the redundant computers. Fault tolerance can be further improved by providing redundant communication controllers such as the communication controller 206 or by providing redundancy at least for critical components of the communication controller.

Figure 3:
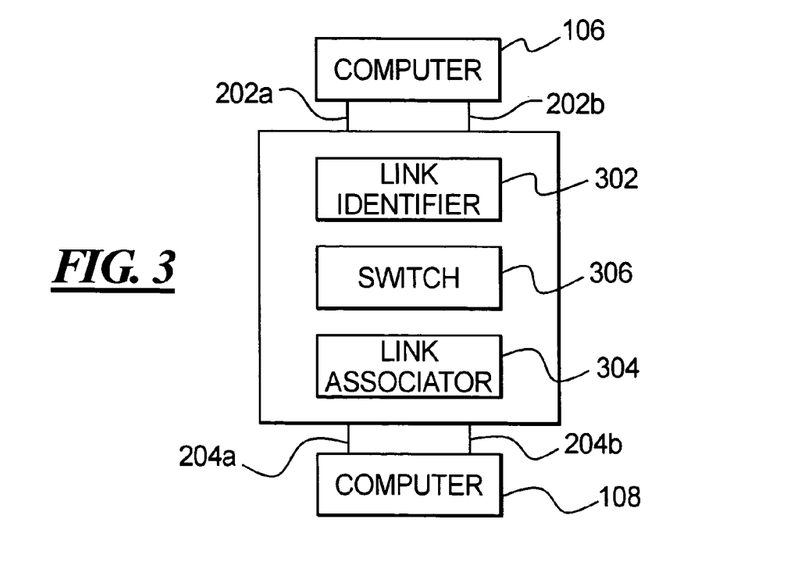
FIG. 3 depicts the communication controller of FIG. 2 in additional detail.

The communication controller 206 is further described with reference to FIG. 3. The communication controller 206 includes a link identifier 302 that identifies the active ones of the first links 202, a link associater 304 that identifies the active ones of the second links 204 so that an active one of the first links 202 can be associated with an active one of the second links 204, and a switch 306 that switches data over the active one of the first links 202 to the associated active one of the second links 204.

The link identifier 302 identifies the possible active ones of the first links 202. At least an active one of the first links 202 is identified by the link identifier 302. An active link is a link on which electrical activity is detected. Such a link receives power and data from its corresponding computer.

Similarly, the link associater 304 identifies the possible active ones of the second links 204. At least an active one of the second links 204 is identified by the link associater 304. An active link is again a link on which electrical activity is detected, and such a link receives power and data from its corresponding computer.

The switch 306 then switches data from the identified one of the first links 202 to the associated identified one of the second links 204, and the identified one of the second links 204 transfers the data to the second computer 108.

The communication controller 206 may be powered by a power supply from either the first computer 106 or the second computer 108. Alternatively, a separate power supply source may be used to power the communication controller 206.

The link identifier 302, for example, may include a first arbitration unit. The first arbitration unit arbitrates between the available (active) first links 202 to identify one of the available first links 202 for data communication between the first computer 106 and the communication controller 206. The link associater 304, for example, may include a second arbitration unit. The second arbitration unit arbitrates between the available second links 204 to identify one of the available second links 204 for data communication between the second computer 108 and the communication controller 206.

The first and second arbitration units implement arbitration criteria in identifying links to be used in passing data. As one example of the arbitration criteria, it may be assumed that two links, one arbitrarily designated as link A and one arbitrarily designated as link B, are connected to a computer. Then, according to this example, if both links A and B are active, then link A is chosen always. However, if link A experiences a fault, data is switched to link B and, while link B is being used to communicate the data, any resolution of the fault on link A does not result in link A being switched back in to communicate the data. Thus, only when the current active link (link B at the current time) becomes inactive is a switchover to the next link effected.

The communication controller 206 detects a fault on a link by detecting whether the link goes dead, i.e., loses power and/or carries no electrical signal. In terms of USB technology, the links are powered by the computer to which the links are connected. Thus, when there is a fault on the link, the power transfer and in turn the communication stops. Loss of power and communication is easy to identify and thereby generate an electrical interrupt to a processing unit.

Each arbitration unit, for example, may be implemented as dynamically downloadable software embedded on a chip, referred to as firmware. Alternatively, each arbitration unit may be implemented as hardware on either of a programmable gate array, a Field Programmable Gate Array (FPGA), an Application Specific Integrated Circuit (ASIC), processor, and/or the like. As a further alternative, each arbitration unit can be implemented as a combination of firmware and hardware.

Figure 4:
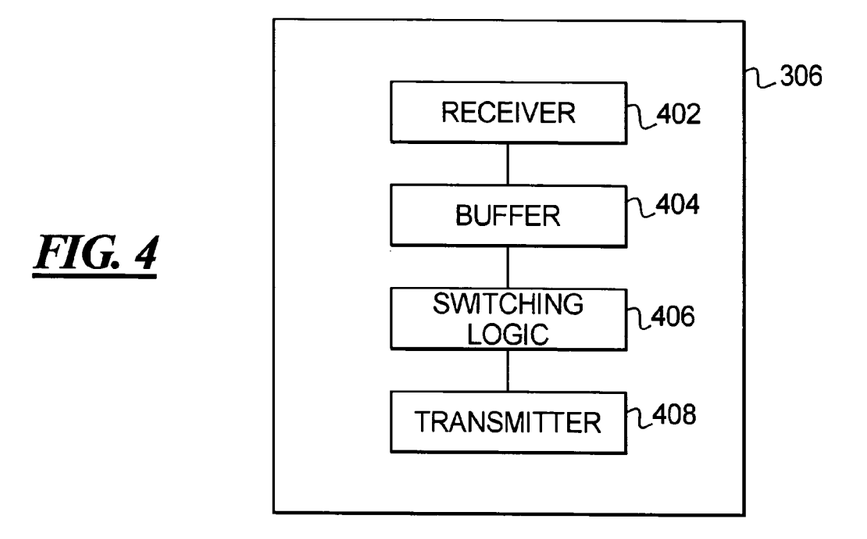
FIG. 4 depicts the switch of FIG. 3 in greater detail.

The switch 306 may include a receiver 402, a buffer 404, switching logic 406, and a transmitter 408. Data is transferred from the first computer 106 over the active one of the links 202 to the receiver 404. The receiver 404 has the handshake or interrupt capability for receiving data. The data received by the receiver 404 is stored in the buffer 406 in the form of data packets of predetermined size. These data packets are arranged in a queue. The switching logic 406 establishes the data path over which data is communicated from the first computer 106 to the second computer 108. The transmitter 408 transmits the data packets in the queue to the second computer 108. Each data packet, for example, may consist of eight bits of data, although the data size can be varied, depending on the capability of the computer as well as the communication controller 206.

The link identifier 302, the link associater 304, and the switch 306 may be implemented in software, in hardware, or in a combination of software and hardware. For example, the link identifier 302, the link associater 304, and the switch 306 may each be implemented, for example, as dynamically downloadable software embedded on a chip, referred to as firmware.

Similarly, the receiver 402, the buffer 404, the switching logic 406, and the transmitter 408 may be implemented in software, in hardware, or in a combination of software and hardware. For example, the buffer 404 may be implemented using any of the known forms of random access memory. The receiver 404 and the transmitter 408, for example, may be implemented on a USB card manufactured by BELKIN, ADS, Adaptec, Keyspan, or the like. Alternatively, the receiver 404 and the transmitter 408 may be implemented on a Firewire card. The switching logic 406 may be implemented as hardware on a programmable gate array, a Field Programmable Gate Array (FPGA), an Application Specific Integrated Circuit (ASIC), a processor, and/or the like. As a further alternative, the switching logic 406 can be implemented as a combination of firmware and hardware.

Figure 5:
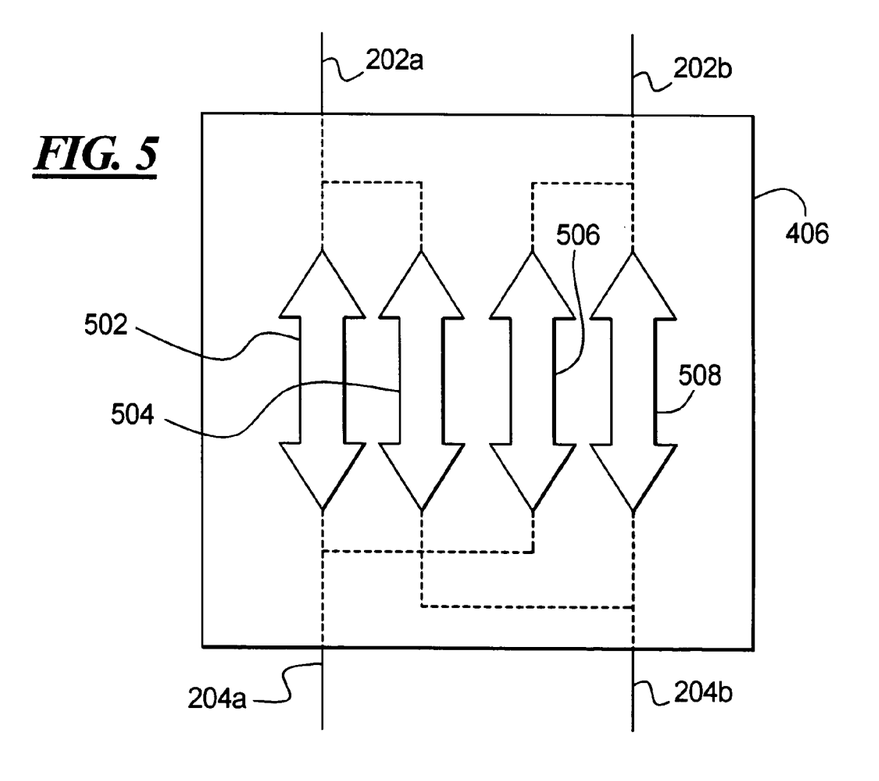
FIG. 5 depicts the possible data paths provided by the communication controller shown in FIGS. 2-4.

In connection with the embodiment shown in FIGS. 1 and 2, the possible data paths that may be established by the switching logic 406 are shown in FIG. 5. The switching logic 406 establishes the data path over which data is communicated from the first computer 106 to the second computer 108. With two active first links 202a and 202b and two active links 204a and 204b, the switching logic 406 can establish four possible data paths, data paths 502, 504, 506, and 508 as shown by dashed lines in FIG. 5. Thus, it should be understood that a data path can be established by the switching logic 406 from any active one of the first links 202 to any active one of the second links 204. These data paths provide alternate paths for communicating data from the first computer 106 to the second computer 108.

For example, consider a case where there are two available first links 202a and 202b and two available second links 204a and 204b. In this case, as discussed above, four possible communication paths are available. More specifically, a first communication path is available to connect the link 202a and the link 204a, a second communication path is available to connect the link 202a and the link 204b, a third communication path is available to connect the link 202b and the link 204a, and a fourth communication path is available to connect the link 202b and the link 204b. The switching logic 406 selects one of the available data paths for communication. Further, in case a fault is encountered, the switching logic 406 enables the switching of the communication to an alternate available data path.

As should be understood from the above description, the communication controller 206, for example, may be implemented on a chip as a combination of modules for the link identifier 302, the link associater 304, and the switch 306. Such modules may be implemented as a combination of firmware and/or hardware or as one or more integrated circuits, FPGAs, ASICs, processors, and/or the like.

Figure 6A:
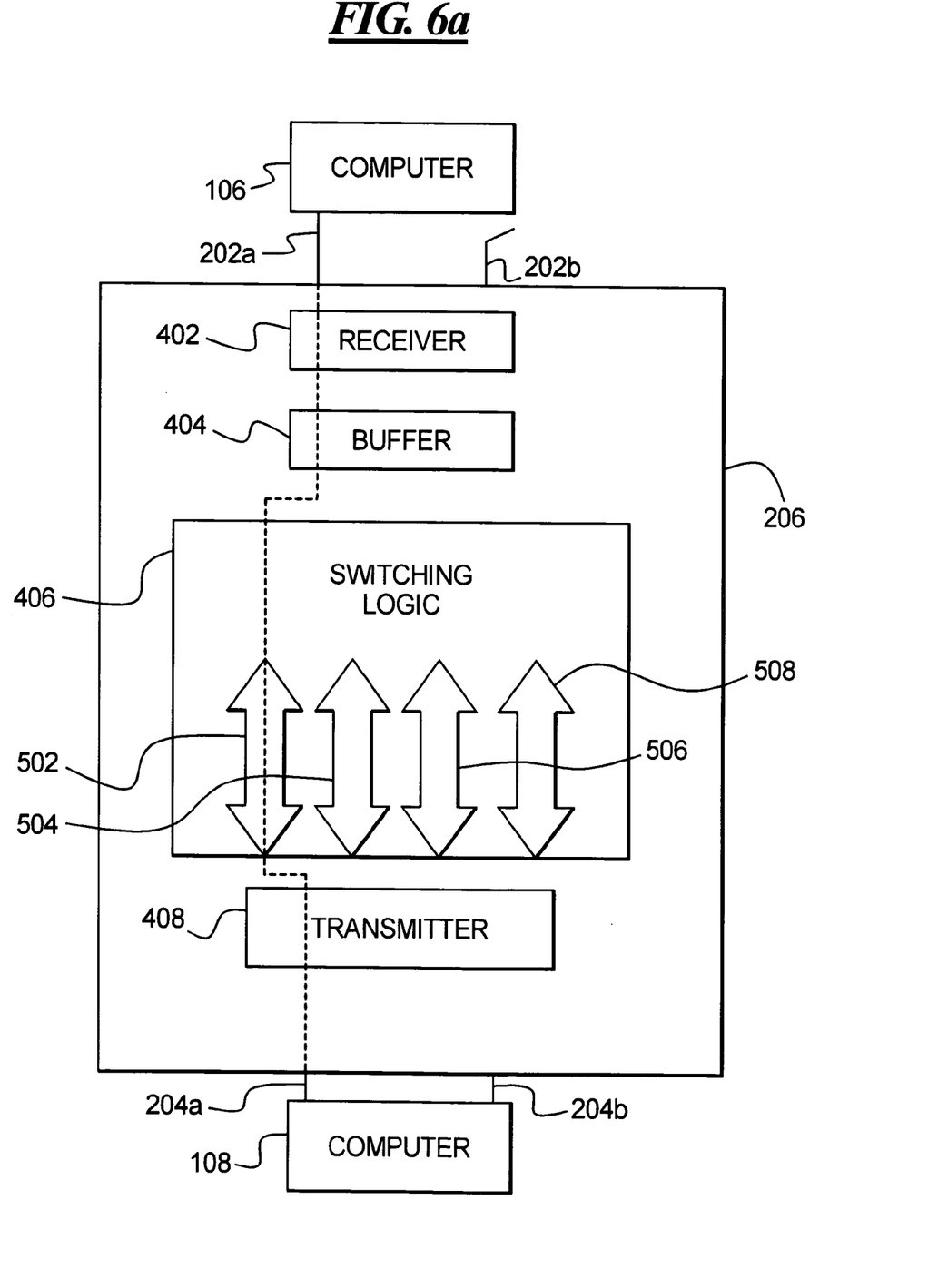
FIG. 6a and FIG. 6b depicts possible single points of failure that are overcome by the present invention.
Figure 6B:
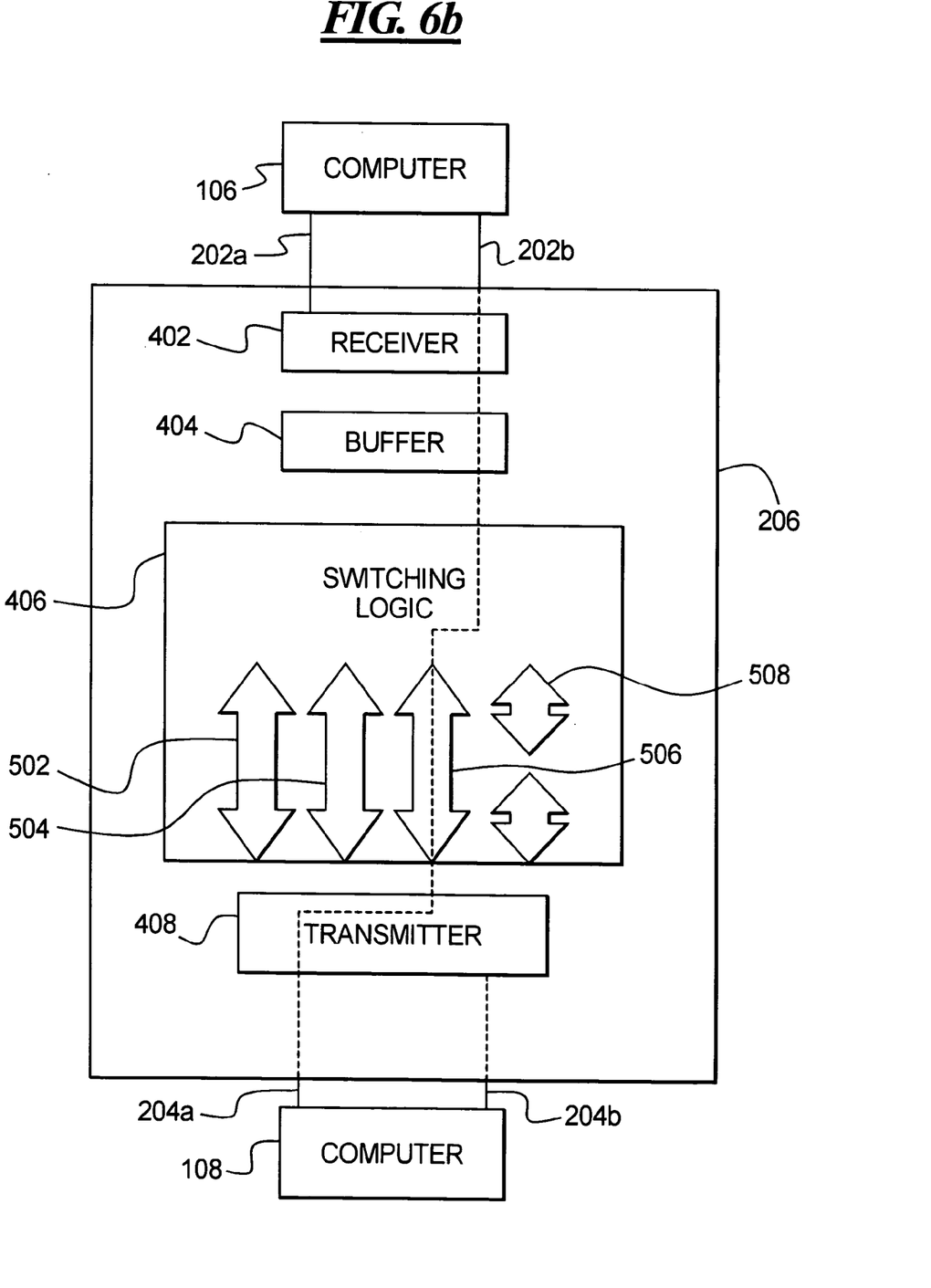

The present invention has the advantage that communication between the first and second computers 106 and 108 is not affected by a single point of failure. In particular, if the communication between the first and second computers 106 and 108 through a communication path fails due to a failure on the communication path, then an alternate fault free communication path is identified. FIG. 6a and FIG. 6b show two such cases of failures.

In connection with FIG. 6a, it is assumed that the arbitration units in the link identifier 302 and the link associater 304 had selected the links 202b and 204a to carry data from the computer 106 and to the computer 108. Thus, the switching logic 406 had established the data path 506 as the data path to carry data from the computer 106 and to the computer 108. It is further assumed that communication between the first and second computers 106 and 108 fails to occur due to a fault in the active link 202b. Consequently, the link identifier 302 identifies the link 202a as an alternate active first link. Once identified, the switching logic 406 establishes the path 502 as the new connection path from the link 202a to the link 204a.

In FIG. 6b, the failure is internal of the communication controller 206. In this case, it is assumed that the arbitration units in the link identifier 302 and the link associater 304 had selected the links 202b and 204b to carry data from the computer 106 and to the computer 108. Thus, the switching logic 406 had established the data path 508 as the data path to carry data from the computer 106 and to the computer 108. It is further assumed that communication between the first and second computers 106 and 108 fails to occur due to a fault in the data path 508. Consequently, the switching logic 406 establishes the path 506 as the new connection path from the link 202b to the new link 204a.

Figure 7:
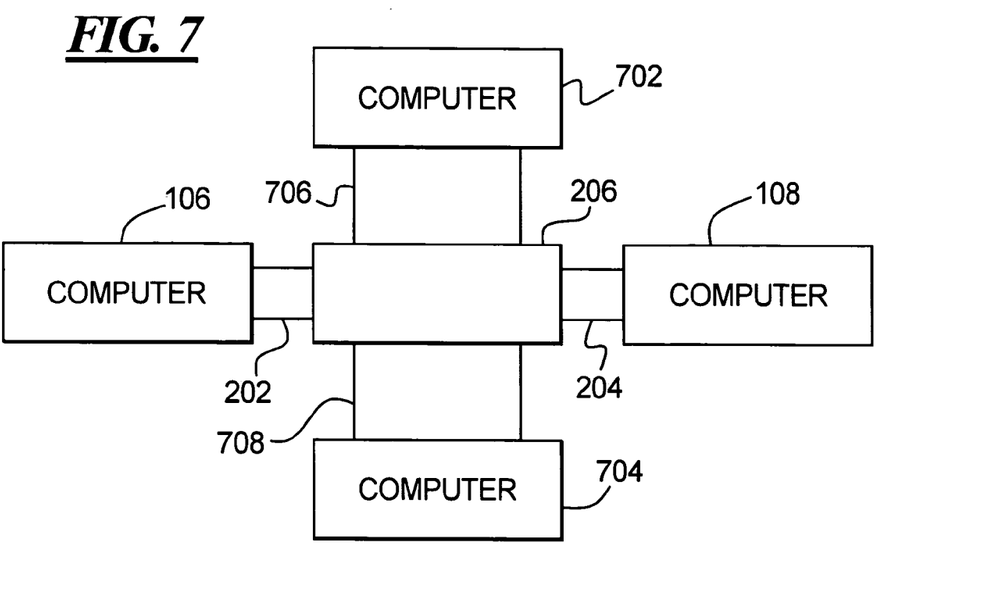
FIG. 7 depicts a redundancy apparatus according to another embodiment of the present invention; and, FIG. 8 is a flowchart depicting a method in accordance with the present invention.

While the present invention has been described using a pair of computers, the technique can be extended to connect more than two computers using two or more than two links. FIG. 7 shows one such embodiment in which four computers 106, 108, 702 and 704 communicate using the communication controller 206. Each computer is connected to the communication controller 206 over at least a pair of links. For example, the computer 702 is connected to the communication controller 206 through a pair of links 706, while the computer 704 is connected to the communication controller 206 through a pair of links 708. The communication controller 206 enables communication between any two computers.

The communication controller 206 can be appropriately modified to enable communication between a pair of computers from amongst the plurality of computers. In particular, the communication controller 206 is configured so that, at any given point of time, any two of the plurality of computers can be configured to communicate with each other. Consequently, once communication is established between a pair of computers, a third computer would not be able to communicate unless the existing communication is broken and a new communication is established with the third computer.

Figure 8:
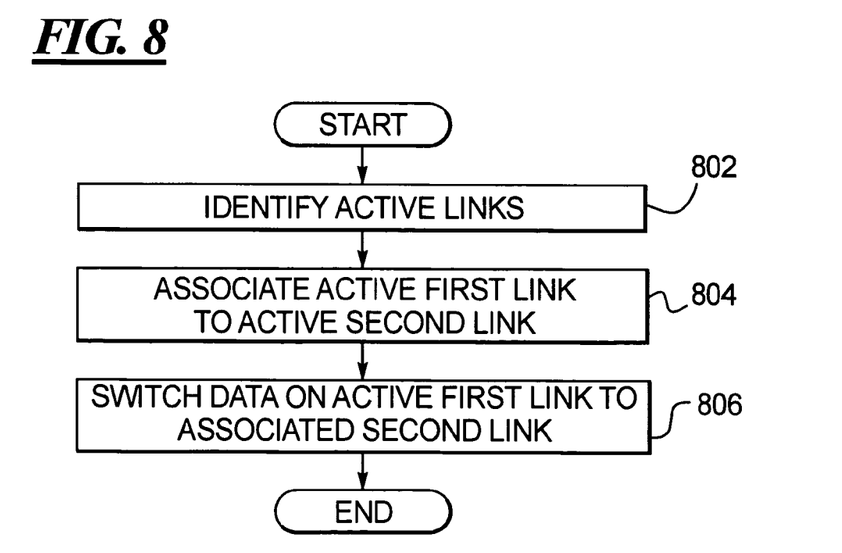

A method for enabling fault tolerant data communication within the redundancy system 104 is described in connection with the flowchart of FIG. 8. All active links are identified at a step 802. In particular, at least an active one of first links 202 and at least an active one of the second links 204 are identified. The identified active first link 202 and the identified active second link 204 are then associated at step 804 to form a communication path. At a step 806, the data received on the identified first active link 202 from the first computer 106 is switched to its associated identified active second link 204. The data switched is then transferred to computer 108.

The method described in connection with FIG. 8 can be implemented by using a hardware based communication controller 206. Alternatively, the method can be implemented by a computer readable code residing in a processing device such as a digital signal processor, a microcontroller, a microprocessor, or a powerPC. The present invention can be implemented in the assembly language for each of these processors. Alternatively, the present invention can be implemented in a high level language such as C, C++, and Java.

The present invention has various advantages that are described as follows.

First, the present invention allows a high speed exchange of data between the first and second computers 106 and 108. In particular, using a link such as USB/Firewire link enables high speed data transfer. The communication over the USB/

Firewire link can occur at speeds that are much higher than speeds over Ethernet. For example, if typical Ethernet is used, communication can occur at a maximum of 100 Mbps. If USB 2.0 is used, then communication can occur at a maximum speed of 480 Mbps. High speed communication allows communication in real time, thereby ensuring a rapid synchronization between the data stored in computers 106 and 108.

Second, the invention technique allows redundancy in the communication links between computers comprising the redundancy apparatus. Redundancy in the links ensures that more than one link is available to exchange data between the computers. Consequently, communication continues between the computers even if a fault is encountered over one connecting path.

Third, the cost of implementing such an apparatus is substantially lower than that of existing redundancy apparatuses. For example, if USB links are used, then the existing USB ports on the first and second computers 106 and 108 are used to connect USB links to the first and second computers 106 and 108. In such a case, the only cost involved is the cost of the communication controller 206. This cost is substantially lower than the cost of the conventional apparatus.

While the embodiments of the technique have been illustrated and described, it will be clear that the technique is not limited to these embodiments only. Numerous modifications, changes, variations, substitutions and equivalents will be apparent to those skilled in the art, without departing from the spirit and scope of the technique, as described in the claims.

What is claimed is:

1. An apparatus for enabling fault tolerant data communication between at least two computers, the apparatus comprising:
    a set of first links connected to a first computer;
    a set of second links connected to at least one second computer; and
    a communication controller coupled to each of the first and second links, wherein the communication controller is arranged to identify an active one of the first links and an active one of the second links and to establish data communication between the identified active one of the first links and the identified active one of the second links, and wherein the communication controller is further arranged to detect a fault in the identified active one of the first links and to switch data communication with the identified active one of the second links over to another active one of the first links.

2. The apparatus according to claim 1, wherein at least one of the first and second links comprises a serial link.

3. The apparatus according to claim 2, wherein at least one of the first and second links is selected from the group consisting of a Universal Serial Bus (USB) link and a Firewire link.

4. The apparatus according to claim 1, wherein at least one of the first and second links comprises a parallel link.

5. The apparatus according to claim 1, wherein communication controller comprises:
    a link identifier arranged to identify the active one of the first links and the active one of the second links;
    a link associater arranged to associate the active one of the first links to the active one of the second links; and
    a switch arranged to switch data between the active one of the first links and the active one of the second links associated therewith.

6. The apparatus according to claim 5, wherein the link identifier and the link associater are arranged to implement arbitration criteria in identifying the active one of the first links and the active one of the second links.

7. The apparatus according to claim 5, wherein the switch comprises:
    a receiver arranged to receive data from the first computer over the active one of the first links;
    a buffer arranged to store the received data; and
    a transmitter arranged to transmit the stored data to the second computer over the active one of the second links.

8. The apparatus according to claim 7, wherein the switch further comprises:
    a plurality of data paths, the data paths interconnecting the buffer and the transmitter; and
    a switching logic, the switching logic selecting one of the data paths to interconnect the buffer and the transmitter.

9. An apparatus for communicating between a set of first active links and a set of second active links, the set of first active links being connected to a first computer, the set of second active links being connected to at least one second computer, each of the links being a Universal Serial Bus (USB) link, the apparatus enabling fault tolerant data communication between the first and the second computer, the apparatus comprising:
    a link identifier arranged to identify an active link, wherein the link identifier applies arbitration criteria to arbitrate between the first USB links;
    a link associater arranged to associate an active first USB link to an active second USB link, wherein the link associater applies arbitration criteria to arbitrate between the second USB links; and
    a switch arranged to switch data received on an active first USB link to its associated active second USB link, the switch comprising
        a receiver arranged to receive data from the first computer over the active first USB link,
        a buffer arranged to store the received data,
        a transmitter arranged to transmit the stored data to the second computer over the active second USB link,
        a plurality of data paths arranged to interconnect the active first USB link to its associated active second USB link, and
        a switching logic arranged to select one of the data paths to interconnect the buffer and the transmitter.

10. A redundancy control apparatus for communication between a pair of computers comprising:
    a set of first links connected to a first computer, wherein at least one of the first links comprises an active first link, and wherein each of the first links comprises a serial link;
    a set of second links connected to at least one second computer, wherein at least one of the second links comprises an active second link, and wherein each of the second links comprises a serial link; and
    a communication controller arranged to communicate data between at least one of the active first links and at least one of the active second links, the communication controller comprising
        a link identifier arranged to identify one of the active first links,
        a link associater arranged to associate the identified active first link to an identified active second link, and
        a switch arranged to switch data between the identified first link and the identified second link associated therewith.

11. The apparatus according to claim 10, wherein the serial link is selected from the group consisting of a Universal Serial Bus (USB) link and a Firewire link.

12. The apparatus according to claim 10, wherein the link identifier and the link associater are arranged to apply arbitrate criteria in identifying the identified first and second links.

13. The apparatus according to claim 12, wherein the switch comprises:
   a receiver arranged to receive data from the first computer over the identified first link;
   a buffer arranged to store the received data; and
   a transmitter arranged to transmit the stored data to the second computer over the identified second link.

14. The apparatus according to claim 13, wherein the switch further comprises:
   a plurality of data paths arranged to interconnecting the active first links with the identified second links; and
   a switching logic arranged to select one of the data paths to interconnect the identified first link and the identified second link associated therewith.

15. A method for providing first and second computers with redundant data, wherein a host interacts with the first computer to access data stored therein, wherein the host interacts with the second computer to access the same data in the event that communication between the host and the first computer fails, wherein the first computer is connected to a set of first active links, wherein the second computer is connected to a set of second active links, and wherein the method comprises:
   identifying at least one of the active first links;
   identifying at least one of the active second links; and
   switching data received on the identified first link to the identified second link so that the second computer redundantly has the data of the first computer.

16. The method according to claim 15, wherein at least one of the first and second active links comprises a serial link.

17. The method according to claim 15, wherein at least one of the first and second active links comprises a parallel link.

18. The method according to claim 15, wherein at least one of the first and second active links consists of one of a Universal Serial Bus (USB) link and a Firewire link.

19. A computer program product for use with a computer, the computer program product comprising a computer usable storage medium storing computer readable program code thereon for providing fault tolerant data communication between a host and at least first and second computers of a redundant computer system to permit the host to interact with the first computer to access data stored therein and to interact with the second computer to access the same data in the event that communication between the host and the first computer fails, wherein the first computer is connected to a set of first active links, wherein the second computer is connected to a set of second active links, wherein the computer program code comprises:
   first program instructions which, when executed, identify at least one of the active first links;
   second program instructions which, when executed, identify at least one of the active second links; and
   third program instructions which, when executed, switch data received on the identified first link to the identified second link so that the second computer redundantly has the data of the first computer.

20. The computer program product according to claim 19, wherein at least one of the first and second active links comprises a serial link.

21. The computer program product according to claim 19, wherein at least one of the first and second active links comprises a parallel link.

22. The computer program product according to claim 19, wherein at least one of the first and second active links consists of one of a Universal Serial Bus (USB) link and a Firewire link.

* * * * *